United States Patent [19]

Gitman

[11] 4,453,913
[45] Jun. 12, 1984

[54] RECUPERATIVE BURNER

[75] Inventor: Grigory M. Gitman, Atlanta, Ga.

[73] Assignee: The Cadre Corporation, Atlanta, Ga.

[21] Appl. No.: 380,560

[22] Filed: May 21, 1982

[51] Int. Cl.$^3$ .............................................. F23Q 9/00
[52] U.S. Cl. ...................................... 431/8; 431/174; 431/175; 431/284; 431/215
[58] Field of Search ...................... 431/8, 12, 174, 175, 431/215, 242, 284, 285, 158; 239/424

[56] References Cited

U.S. PATENT DOCUMENTS

| | | | |
|---|---|---|---|
| 1,995,934 | 3/1935 | Mangold | 158/110 |
| 2,138,998 | 12/1938 | Brosius | 431/8 |
| 2,806,516 | 9/1957 | Brola | 158/1 |
| 2,971,577 | 2/1961 | Wallace | 158/106 |
| 3,092,166 | 6/1963 | Shepherd | 158/11 |
| 3,135,626 | 6/1964 | Moen et al. | 117/105.2 |
| 3,330,485 | 7/1967 | Misner | 239/419 |
| 3,592,622 | 7/1971 | Shepherd | 65/135 |
| 3,649,206 | 3/1972 | Ivernel | 431/8 |
| 3,685,740 | 7/1972 | Shepherd | 239/400 |
| 3,734,719 | 5/1973 | Estes et al. | 75/65 |
| 4,210,411 | 7/1980 | Ward et al. | 431/160 |
| 4,257,762 | 3/1981 | Zink et al. | 431/284 |
| 4,291,190 | 9/1981 | Elsner et al. | 13/18 R |

OTHER PUBLICATIONS

Selas, Bulletin DNS-R "DNS-Recoup Burner with Integral Recuperator", 4 pages.
Institute of Gas Technology "Fine-Ground Coal Combustion", 4 pages.
Eclipse, Eclipse Combustion Division of Eclipse Inc., "Eclipse Medium Velocity Air Burner/Recuperator Package", H-350 Bulletin, New 6/81, 3 pages.
R. C. Bojko, M. J. Khinkis, R. T. Waibel of Inst. of Gas Tech. Engy. Dev. Center and W. D. Boyd of Southern Calif. Gas Co., "Experimental Study of the Effect of Air Preheat Up to 1200° on No Emissions", p. 4–1 to p. 4–17.
J. M. Bailey & G. Whitaker, Presentation 10B, FIA Symposium, 1–81, "Energy Savings by the Use of Recuperative Burners in the Forging Industry", Cover & pp. 1–15.

Primary Examiner—Carroll B. Dority, Jr.
Attorney, Agent, or Firm—Thomas & Kennedy

[57] ABSTRACT

A pair of burner tubes are arranged in concentric relationship. Fuel and air in a rich fuel-air ratio is provided to the central burner tube, and fuel and air in a lean fuel-air ratio is provided to the outer burner tube. The rich combination of fuel and air is partially burned at a temperature of about 2,500° F. while the lean combination of fuel and air is burned at a temperature of less than 2,800° F., and the flames from the burner tubes are mixed at the ends of the burner tubes to form a final flame envelope and to finish the combustion of the rich mixture. Exhaust gas is directed about the burner tubes, and combustion supply air is circulated about and preheated by the exhaust gas conduits and the outer burner tube. The separate combustion of the rich and lean fuel-air mixtures at relatively low temperatures and the subsequent mixing of the flames from the burner tubes results in low NOx emissions and results in high luminosity of the final flame envelope.

13 Claims, 4 Drawing Figures

RECUPERATIVE BURNER

BACKGROUND OF THE INVENTION

This invention relates to a heat recuperative fluid fuel burner with concentric burner tubes in which fuel and air in a rich fuel-air ratio is burned in the central burner tube and fuel and air in a lean fuel-air ratio is burned in the outer burner tube so as to reduce NOx emissions and improve flame luminosity when the flames are mixed together to form a final flame envelope.

The use of natural gas fuel and other gas fuels for heating purposes is less expensive than using oil or coal and other such fuels, but natural gas fuels tend to produce a flame with low luminosity. High flame luminosity is desirable to increase radiant heat transfer from the flame. In addition, as the temperature of the flame emitted from a gas-air mixture is increased, additional NOx emissions are created. If the combustion air is preheated prior to mixing with the fuel, the increased air temperature tends to reduce flame luminosity in conventional hot air burners and in conventional recuperative burners. The blue translucent gas flame is not desirable when radiation is the predominant heat transfer mechanism in high temperature applications. Therefore, conventional natural gas burners usually are considered to be impractical for use with high temperature applications such as in the primary metals industry and in the glass production industry where a high radiation component of heat transfer is desired.

It has been known to burn lean and rich fuel mixtures separately at low flame temperatures and to mix the flames after partial burning of the rich mixture has been accomplished so as to reduce NOx emissions in the resulting high temperature flame. Most of the existing low NOx burners with stage combustion are series type, in that, for example, a lean fuel-air mixture is injected into the first stage of a burner and burned, and additional fuel is added downstream of the first stage combustion zone. In other situations a rich fuel-air mixture is initially injected in the burner and additional air is injected downstream of the first stage combustion zone. This is a series arrangement in which the combustion products of the first stage are cooled moderately to keep the flame temperature down in order to reduce the possibility of thermal NOx formation. This tends to decrease the amount of free oxygen for possible reaction with nitrogen in the final flame because the utilization of oxygen for the rich and the lean flames reduces the amount of oxygen left for burning in the final flame. Generally, both the lean and rich flame temperatures should be maintained below 2,800° F. in order to avoid excessive NOx emissions. Therefore, preheating the combustion air which results in a higher flame temperature creates the hazard that the flame will exceed the desired temperature.

If super lean and super rich fuel-air mixtures are used in staged combustion chambers, the flame temperatures can be kept below the desired temperatures for avoiding NOx emissions even if the combustion air is preheated. In the rich fuel-air chamber, NOx emissions are unlikely to form because of the small supply of free oxygen. The excess air in the lean fuel-air chamber allows more air to lower the flame temperature.

SUMMARY OF THE INVENTION

Briefly described, the present invention comprises a burner which includes a pair of concentrically arranged burner tubes, with means for supplying a rich fuel-air mixture to the inner tube and means for supplying a lean fuel-air mixture to the outer tube. A diverter is former at the delivery ends of the burner tubes to direct the outer concentric flame inwardly toward the central flame, causing the flames to mix together. The exhaust gases from the chamber to which the flame is directd are exhausted through a flue conduit that surrounds the burner tubes, and combustion air is directed through an air supply conduit that surrounds the exhaust gas conduit, so that the heat from the burner tubes and from the exhaust gas conduit is substantially recovered by the on-coming combustion air.

The fuel-air mixtures and the temperatures of the flames in the burner tubes are carefully controlled so as to minimize NOx formation and so as to increase flame luminosity.

Thus, it is an object of this invention to provide a fluid fuel burner which is constructed and arranged to minimize NOx formation and to increase flame luminosity.

Another object of this invention is to provide a heat recuperative gas burner wherein a pair of concentric burner tubes are utilized to form separate low temperature flames within the burner tubes, with one flame generated by a rich fuel-air mixture and the other flame generated by a lean fuel-air mixture, and then to mix the flames together to increase the flame temperature and flame luminosity while minimizing NOx formation.

Another object of this invention is to provide a fluid fuel burner which is relatively inexpensive to construct and to maintain, which includes multiple burner chambers, fuel nozzles that can be expediently modified to adjust the delivery of fuel to the burner chambers, and which includes heat recuperation duct work by which the on-coming combustion air is preheated by the heat emitted from the burner and by the exhaust gases from the heated chamber.

Other objects, features and advantages of the present invention will become apparent upon reading the following specifications, when taken in conjunction with accompanying drawings.

DETAILED DESCRIPTION

Figure 1:
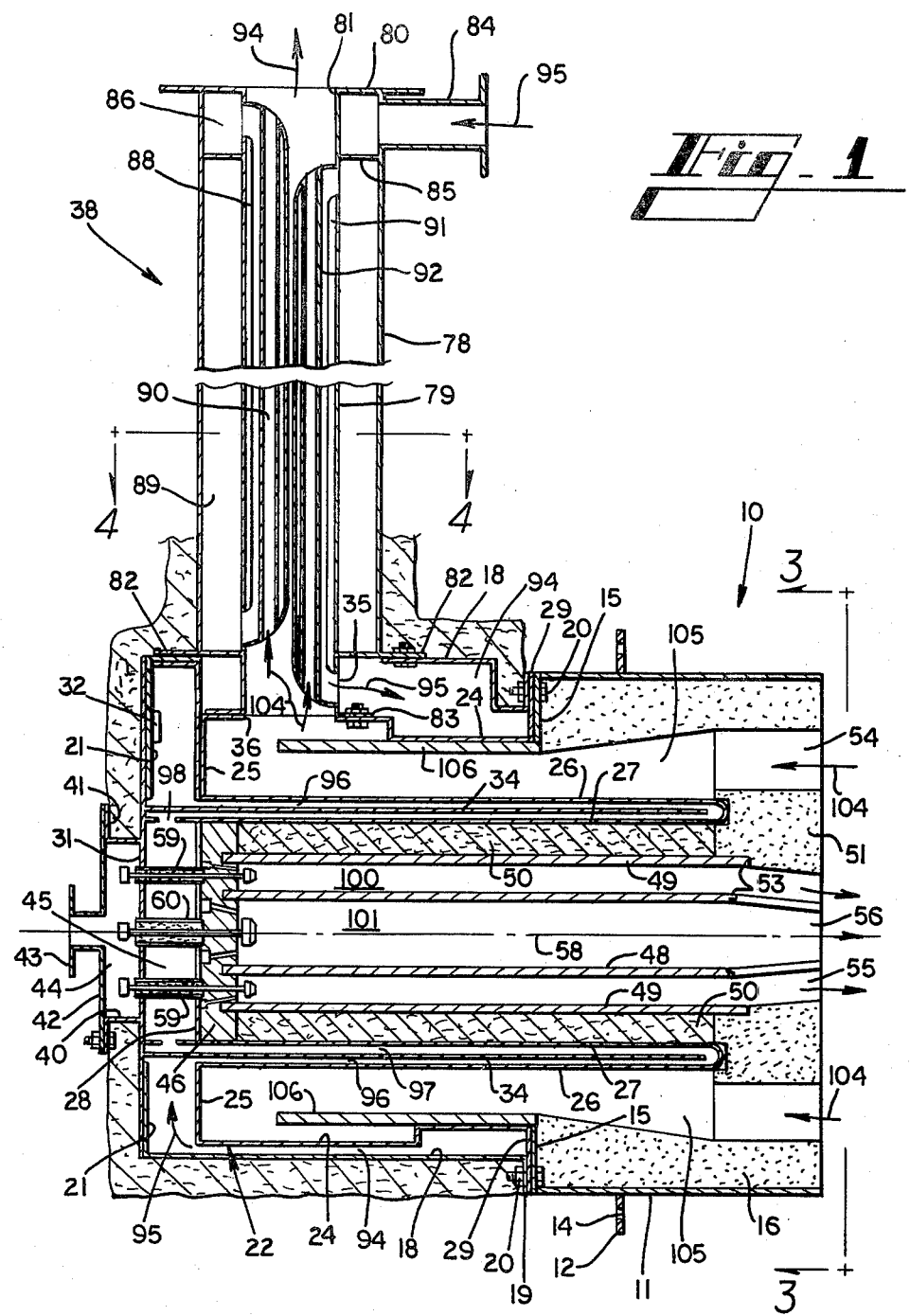
FIG. 1 is a side cross sectional view of the burner and a cross sectional view of the heat recuperator.

Referring now in more detail to the drawings, in which like numerals indicate like arts throughout the several views, FIG. 1 illustrates a fluid fuel burner 10 that includes a mounting cylinder 11 with an annular mounting plate 12 extending radially from cylinder 11. Mounting plate 12 includes openings 14 for receiving connector screws (not shown) whereby the burner can be mounted to a support element such as to a furnace wall or to the lid of a ladle heater, etc. A radially inwardly projecting annular support flange 15 extends inwardly from the edge portion of mounting cylinder 11, and cast ceramic insulator sleeve 16 is received in mounting cylinder 11 and abuts the inwardly projecting annular flange 15.

Burner body 18 is substantially cylindrical and includes radially outwardly projecting mounting flange 19 positioned adjacent the annular flange 15 of mounting cylinder 11 and connected thereto by bolts 20. The other end portion of burner body 18 includes inwardly projecting wall 21. Recuperator sleeve 22 is also approximately cylindrically shaped and includes outer shell 24, annular wall 25, intermediate shell 26, inner shell 27 and distribution plate 28. Radially outwardly projecting annular flange 29 is located between flanges 15 and 19 and is held in position by bolts 20.

Nozzle mounting plate 31 is positioned parallel to distribution plate 28 and is attached by bolts 32 to walls 21 of burner body 18. Cylindrical insert 34 is mounted at one end portion to nozzle mounting plate 31 and is of a diameter and length for inserting between the intermediate shell 26 and inner shell 27 of the recuperator sleeve 22.

The upper portion of burner body 18 defines an opening 35 and the upper portion of recuperator sleeve 22 defines an opening 36 for the passage therethrough of incoming combustion air and outgoing flue exhaust gases, respectively. Convective heat recuperator 38 is mounted about openings 35 and 36 and directs the combustion air and exhaust gases, as will be described more fully hereinafter.

Cylindrical collar 40 extends outwardly from nozzle mounting plate 31 and includes radially projecting flange 41. Gas manifold plate 42 and its flange 43 are mounted to collar 40 so as to form a gas supply plenum 44. The space 45 between nozzle mounting plate 31 and distribution plate 28 comprises a combustion air plenum.

Insulation plate 46 is located in abutment with distribution plate 28, and a pair of concentric cylindrical burner tubes 48 and 49 are located concentrically within recuperator sleeve 22, with one end portion of each burner tube received in a circular groove formed in the insulation plate 46. Ceramic refractory heat insulating material 50 is formed about the outer burner tube and substantially fills the space between the outer burner tube 49 and the inner shell 27 of recuperator sleeve 22.

Figure 3:
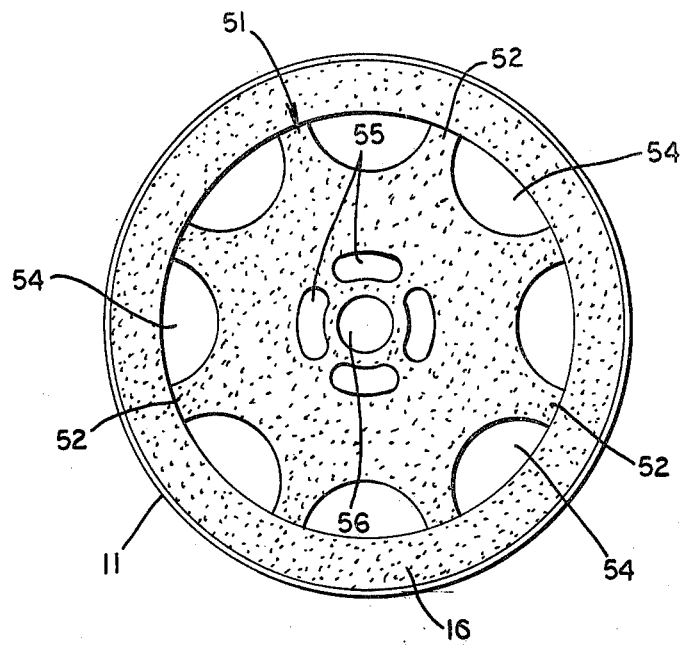
FIG. 3 is an end view of the burner, taken along lines 3—3 of FIG. 1.

Support spider 51 (FIGS. 1 and 3) is located at the other ends of burner tubes 48 and 49 and defines annular grooves for receiving the other ends of the burner tubes. Support spider 51 includes radiating projections 52 which abut the inner cylindrical surface of cast ceramic insulator sleeve 16 so that exhaust gas openings 54 are formed between spider 51 and insulator sleeve 16. An annular array of flame discharge openings 55 are formed in support spider 51, and central flame discharge opening 56 is located concentrically with respect to the array of openings 55. Central flame discharge opening 56 is tapered from adjacent burner tube 48 to the outside of the burner so as to form a converging Venturi nozzle and to increase the velocity of combustion gases emitted from central burner tube 48. Likewise, flame discharge openings 55 are angled toward the central longitudinal axis 58 of the burner and are progressively reduced in cross sectional area from adjacent the burner tubes 48 and 49 toward the outside of the burner to form Venturi nozzles and to accellerate the flame as it is emitted from the outer burner tube and to direct the flame emitted from the outer burner tube inwardly toward the flame emitted from the inner burner tube.

Figure 2:
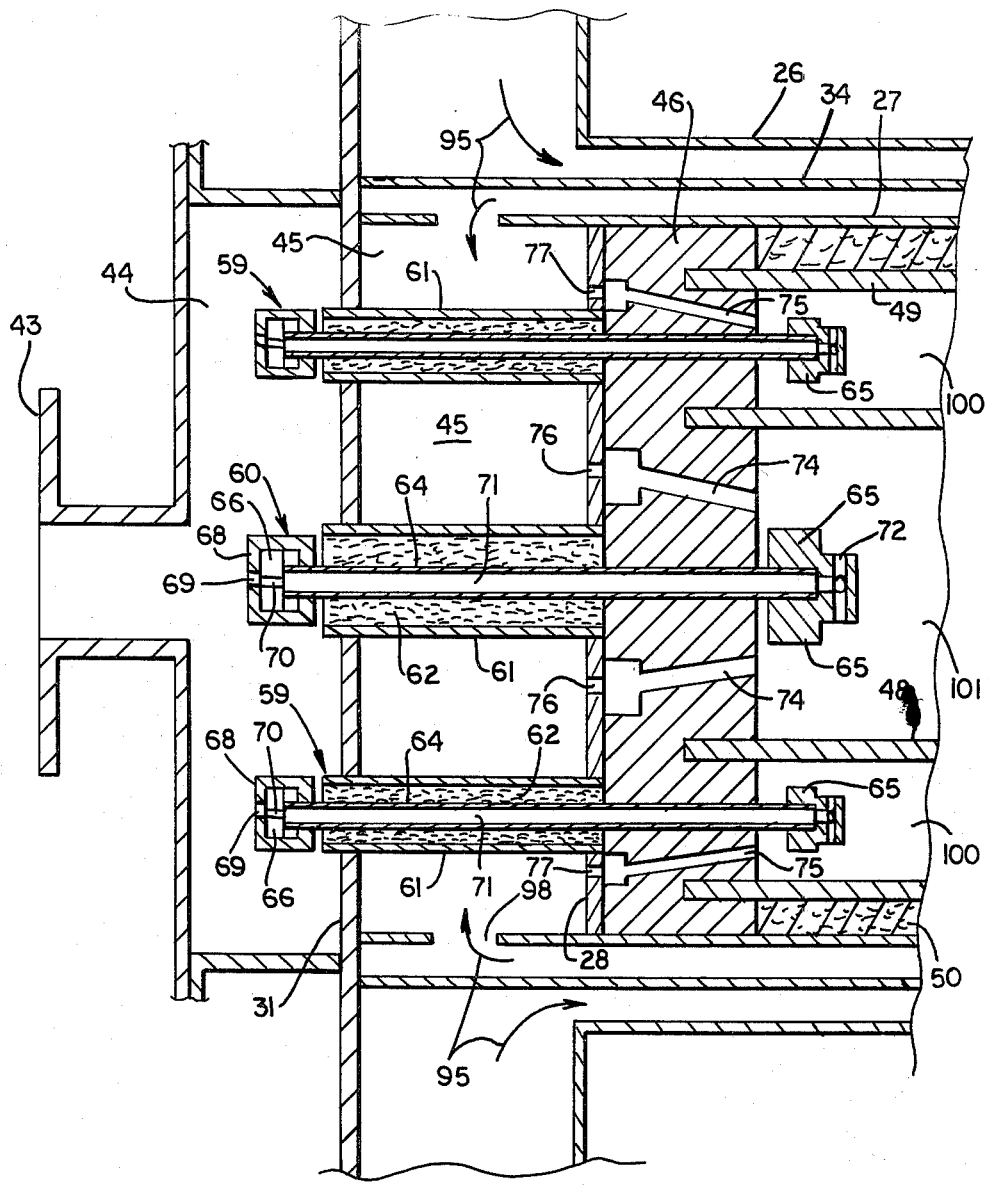
FIG. 2 is a detail illustration of the fuel nozzles of the burner.

As illustrated in FIG. 2, a plurality of fuel nozzle assemblies 59 are arranged in an annular array about the central longitudinal axis 58 of the burner, and each fuel nozzle assembly 59 extends from fuel supply plenum 44 through nozzle mounting plate 31, through combustion air plenum 45, through distribution plate 28 and through insulation plate 46 into the annular space formed between the inner and outer burner tubes. Likewise, a larger, single fuel nozzle assembly 60 is located centrally within the annular array of fuel nozzle assemblies 59 at the axis 58 of the burner, and extends from fuel supply plenum 44 through nozzle mounting plate 31, through combustion air plenum 45, through distribution plate 28 and through insulation plate 46 and into the inner burner tube 48.

Each nozzle assembly 59 and 60 includes an outer mounting tube 61 that extends from nozzle mounting plate 31 to distribution plate 28, ceramic sleeve 62 that is received within outer mounting tube 61 and which abuts insulation plate 46, nozzle conduit 64 which extends through the sleeve opening and which projects through distribution plate 46, nozzle element 65 which is mounted on the protruding end portion of nozzle conduit 64, orifice disc 66 which is positioned in abutment with the other end of nozzle conduit 64, and nozzle cap 68 which extends about orifice disc 66 and is threadedly attached to the rear protruding end portion of nozzle conduit 64. Nozzle cap 68 includes gas opening 69, and orifice disc 66 includes fuel opening 70 which is aligned with fuel opening 69 and is aligned with the opening 71 extending through nozzle conduit 64. Likewise, nozzle element 65 includes fuel openings 72 which communicate with the passage 71 through nozzle conduit 64. Therefore, a fuel path for the passage of fuel, such as natural gas, is formed from fuel supply plenum 44 through each nozzle assembly 59 and 60 into the tubular burners 48 and 49.

If it is desired to change the cross sectional area of the path extending through the nozzle assemblies 59 and 60 so as to increase or decrease the volume of fuel flow through the nozzle assemblies, the orifice disc 66 can be replaced with another orifice disc with a larger or smaller opening 70, by removing the nozzle cap 68 from the end of the nozzle conduit 64, removing the orifice disc 70 from the cap and inserting a new orifice disc therein, and remounting the cap on the end of the nozzle conduit. Since this adjustment to the nozzle assemblies is made at the rear of the nozzle assembly, the nozzle assemblies do not have to be removed from the burner tubes while making the adjustment.

Insulation plate 46 also includes air passages 74 and 75 which extend therethrough and which communicate with inner and outer burner tubes respectively at the inside surface of the insulation plate. Distribution plate 28 includes calibrated openings 76 and 77 which register with passages 74 and 75, respectively, so that combustion air plenum 45 communicates through distribution plate 28 and insulation plate 46 with the burner tubes 48 and 49.

Figure 4:
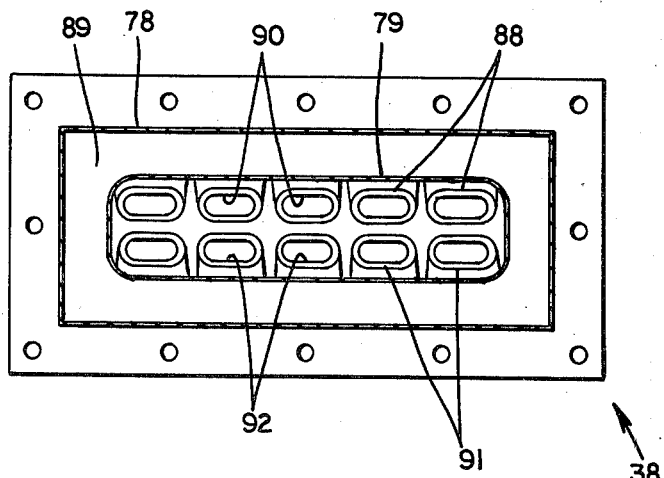
FIG. 4 is a horizontal cross sectional view of the heat recuperator of FIG. 4, taken along lines 4—4 of FIG. 1.

As illustrated in FIGS. 1 and 4, the convective heat recuperator 38 is mounted to the upper portion of burner 10. The convective heat recuperator 38 includes other rectangular shell 78 and inner shell 79 that extends through outer shell 78. Outer and inner shells 78 and 79 are joined at their upper ends by upper mounting plate 80, with the mounting plate defining an opening 81 that communicates with the upper end portion of inner shell 79. Outer lower mounting plate 82 is formed on outer shell 78 and abuts the exterior surface of inner shell 79. Inner lower mounting plate 83 is mounted to the lower protruding end portion of inner shell 79. Air inlet collar 84 opens into outer shell 78 adjacent upper mounting plate 81, and internal horizontal partition 85 separates the upper end portion of outer shell 78 from the lower portion thereof to form an inlet air plenum 86 at the upper end of the heat exchanger about the inner shell 79.

A first plurality of vertically extending conduits 88 communicate at their upper L-shaped end portions through inner shell 79 with inlet plenum 86 above partition 85 and extend downwardly through inner shell 79 and then turn at their lower end portions to communicate through inner shell 79 with the lower portion of heat exchange chamber 89 located between outer and inner shells 78 and 79. Flue tubes 90 extend vertically and concentrically through first vertical conduits 88. Likewise, a second plurality of vertical conduits 91 open at their upper L-shaped end portions through inner shell 79 immediately below partition 85 to communicate with the upper end portion of heat exchange chamber 89 and extend downwardly through inner shell 79 and turn at their lower end portions to communicate through the lower end portion of inner shell 79 below lower outer mounting plate 82. A flue tube 92 extends vertically through each of the vertical conduits 91.

As illustrated in FIG. 1, the lower outer mounting plate 82 is mounted to burner body 18 and lower inner mounting plate 83 is mounted to recuperator sleeve 22. Therefore, inner shell 79 communicates with recuperator sleeve 22 to receive the exhaust gases from the burner and to direct the exhaust gases in an upward direction through the convective heat recuperator 38 as indicated by flow arrows 94, and outer shell 78 communicates with burner body 18 to direct the on-coming combustion air through air inlet collar 84 and out of the lower end of inner shell 79, as indicated by flow arrows 95.

OPERATION

When the burner is placed in operation, natural gas or other fluid fuel at greater than atmospheric pressure is directed by a conduit (not shown) which is connected to the collar of gas manifold cap 42 to the fuel supply plenum 44, and the gas moves at substantially equal pressure into each fuel nozzle assembly 59 and 60. The fuel moves through the nozzle assemblies and enters the closed end portions of the inner and outer burner tubes 48 and 49.

In the meantime, combustion air at greater than atmospheric pressure moves through convective recuperator 38 and into the annular space 94 located between burner body 18 and outer shell 24 of recuperator sleeve 22. The air is induced to move as indicated by flow arrows 95 along the length of the outer annular space 96 between intermediate shell 26 of recuperator sleeve 22 and cylindrical insert 34 of nozzle mounting plate 31, and then turn about the cylindrical insert 34 to move in the opposite direction through the annular passage 97 formed between cylindrical inset 34 and inner shell 27 of flue sleeve 22, and then move through openings 98 about the periphery of combustion air plenum 45 and into the combustion air plenum. This causes the on-coming combustion air to be preheated as it approaches combustion air plenum 45. The air then moves through air passages 74 and 75 into the closed end portion of burner tubes 48 and 49 and the air mixes with the fuel within the burner tubes.

The fuel-air ratio of natural gas and air injected in the outer burner tube 49 preferably is lean, between 0.03 and 0.05 fuel to air, while the fuel-air ratio of the fuel and air injected into the inner burner tube 48 is relatively rich, between 0.25 and 0.4 fuel to air. The temperature of the on-coming combustion air moving through combustion air plenum 45 reaches approximately 1,400° F. before the air is delivered to the burner tubes. The temperature of the flame generated in the annular lean chamber 100 which is formed between the inner and outer burner tubes is to be adjusted so as to be less than 2,700° F. The adjustment is made by varying the fuel-air ratio, as by varying the pressure of the on-coming combustion air and fuel. Substantially complete combustion of the fuel occurs in the annular lean chamber 100. In the meantime, the temperature of the flame formed in the centrally-located rich chamber 101 is controlled at a level about 2,400° F., and incomplete combustion occurs within the central chamber. Again, the temperature of the flame is controlled by varying the fuel-air ratio.

As the flames from the central and annular chambers are emitted from the open ends of the burner tubes, support spider 51 functions as a diverting means to divert the flame from the annular chamber 100 between the inner and outer burner tubes inwardly toward the flame emitted from the inner chamber 101 of the inner burner tube, and the flame discharge openings 55 of the support spider converge to a smaller cross-sectional area from adjacent the burner tubes to the outside of the burner so that the velocity of the flame is accelerated as it moves through the flame discharge openings 55. Likewise, the velocity of the flame from the inner burner tube 48 is accelerated by the converging central flame discharge opening 56. As the flames are emitted from the burner 10, the flames are mixed together, and the unburned fuel from the central flame mixes with the unburned oxygen from the outer annular flame so that the combustion of the fuel is completed beyond the burner. The composite flame has a higher temperature, approximately 3,500° F., and a luminosity close to oil flame.

The gases of combustion which are exhausted from the chamber (not shown) into which the flame was projected move back about support spider 51, through the exhaust gas openings 54 formed between the spider and its cast ceramic insulator sleeve 16 as indicated by flow arrows 104 and move into the annular passage 105 formed between insulator sleeve 16 and recuperator sleeve 22, and then move through cylindrical baffle 106 and are exhausted through outlet opening 36 of recuperator sleeve 22 and move upwardly through the convective heat recuperator 38. The exhaust gases usually will be in the temperature range of 1,800° F. to 2,400° F. as they enter annular passage 105.

It will be noted that the temperature of the flame in the central rich chamber 101 is to be about 300° F. less than the temperature of the flame in the annular lean chamber 100. Therefore, there will be heat transfer from the outer annular lean chamber 100 into the inner rich chamber 101. Moreover, even though a substantial amount of insulating material 50 is located between the outer burner tube 49 and the recuperator sleeve 22, some heat is tranferred through the insulating material 50 from the outer burner tube 49 and will be picked up by the on-coming combustion air as the on-coming combustion air moves through the passages 96 and 97 of the recuperator sleeve 22. Moreover, it will be noted that the annular space 94 through which the on-coming combustion air moves surrounds a portion of the annular passage 105 through which the gases of combustion move. Therefore, heat from the exhaust gases is transferred to the on-coming combustion air.

While the disclosed embodiment specifies cylindrical burner tubes, it should be understood that burners of other shapes can be utilized. Moreover, while natural gas has been disclosed as the fuel utilized in the disclosed embodiment, the fuel utilized can be any combustible flowable fuel, including natural gas, artificial gas, fuel oil, pulverized coal, and different types of fuels can be used simultaneously as by using fuel oil in a rich fuel-air ratio in the center burner and natural gas in a lean fuel-air ratio in the outer burner.

While this invention has been described in detail with particular reference to a preferred embodiment thereof, it will be understood that variations and modifications can be effected within the spirit and scope of the invention as descried hereinbefore and as defined in the appended claims.

I claim:

1. A heat recuperative burner comprising a central burner tube, an outer burner tube surrounding said central burner tube, said central and outer burner tubes being closed at one common end by a distribution plate and open at their other ends, an air supply plenum positioned adjacent said air distribution plate, air passages extending from said air supply plenum through said distribution plate and into the closed end portions of said central and outer burner tubes, an air supply conduit surrounding said outer burner tube and communicating with said air supply plenum for moving air to said air supply plenum, an exhaust flue surrounding a portion of said air supply conduit for moving flue gases about and away from said burner, and fuel supply nozzles extending into the closed end portions of said central burner tube and said outer burner tube for delivering fuel to said burner tubes, whereby air is directed through said air supply conduit to the burner tubes and is preheated by heat emitted from the exhaust flue and the outer burner tube, fuel is directed through the fuel supply nozzles into the burner tubes and the gas and air is mixed and ignited in the burner tubes and exhausted from the delivery ends of the burner tubes, and flue gases are exhausted through the exhaust flue and heat the on-coming air.

2. The burner of claim 1 wherein said air supply conduit surrounds a portion of said exhaust flue, whereby heat is transferred from the exhaust gases to the on-coming air.

3. The burner of claim 1 and further including a fuel supply plenum positioned adjacent said air supply plenum, and wherein said fuel supply nozzles extend from said fuel supply plenum through said air supply plenum and into the closed end portions of said burner tubes, whereby fuel is delivered to all of said fuel supply nozzles at a substantially equal pressure at each nozzle.

4. A burner for forming with natural gas a low NOx luminous flame comprising at least two approximately concentric burner tubes for forming flames therein, means closing said burner tubes at one common end and said burner tubes including flame discharge openings at their other common end, means for providing fuel and air at a lean fuel-air ratio of from approximately 0.03 to 0.05 by volume natural gas to air to the closed end portion of one of said burner tubes whereby the fuel and air are partially burned within said one burner tube, and means for providing fuel and air at a rich fuel-air ratio of from approximately 0.25 to 0.5 by volume natural gas to air to the closed end portion of the the other one of said burner tubes whereby the fuel and air are partially burned within said other burner tube, and a flame diverter for directing the flame generated by the outer burner tube inwardly toward the flame generated by the inner burner tube for combining the flames from the burner tubes beyond the flame discharge openings at the other ends of the burner tubes whereby the air in the flame generated by the lean fuel-air mixture supports combusion of the fuel in the flame generated by the rich fuel-air mixture.

5. A burner comprising at least two approximately cylindrical concentric burner tubes, means for providing fuel and air at a lean fuel-air ratio to one end portion of one of said burner tubes and means for providing fuel and air at a rich fuel-air ratio to one end portion of the other one of said burner tubes, means for combining the flames from the burner tube at the other ends of said burner tubes, an exhaust flue extending about said outer cylindrical burner tube for exhausting flue gases about said burner tubes, and an air supply conduit extending about said exhaust flue for directing air to said cylindrical burner tubes.

6. A burner comprising at least two approximately concentric burner tubes, means for providing fuel and air at a lean fuel-air ratio to one end portion of one of said burner tubes and means for providing fuel and air at a rich fuel-air ratio to one end portion of the other one of said burner tubes, means for combining the flames from the burner tubes together at the other ends of said burner tubes, a distribution plate closing one end portion of each of the burner tubes, and air supply plenum positioned adjacent said distribution plate, air passages extending from said air supply plenum through said distribution plate and into the closed end portions of said burner tubes, a fuel supply plenum positioned adjacent said air suply plenum, and fuel supply nozzles extending from said fuel supply plenum through said air supply plenum and into the closed end portions of said burner tubes.

7. A burner comprising at least two approximately concentric burner tubes, means for providing fuel and air at a lean fuel-air ratio to one end portion of one of said burner tubes and means for providing fuel and air at a rich fuel-air ratio to one end portion of the other one of said burner tubes, means for combining the flames from the burner tubes together at the other ends of said burner tubes, an exhaust flue surrounding said burner tubes, and an air supply conduit surrounding said exhaust flue.

8. The burner of claim 4 and wherein said flame diverter comprises a spider constructed and arranged to hold said burner tubes in spaced concentric relationship with respect to each other.

9. A method of reducing NOx emissions and increasing flame luminosity of a gas fired burner comprising the steps of burning fuel and air in a rich fuel-air mixture of between approximately 0.25 and 0.5 by volume fuel to air in a first burner tube of a pair of concentrically arranged burner tubes, burning fuel and air in a lean fuel-air mixture of between approximately 0.03 and 0.05 by volume fuel to air and at a higher temperature than the flame in the first burner tube in the second burner tube of the pair of concentrically arranged burner tubes, combining the flames from the concentrically arranged burner tubes after both the rich and lean fuel-air mixtures have been at least partially burned and generating a final flame envelope in which the combustion of the unburned fuel from the rich fuel-air mixture is supported by the air from the lean fuel-air mixture.

10. The method of claim 9 and wherein the step of combining the flames comprises projecting the flames beyond their respective concentrically arranged burner tubes so that one flame is substantially surrounded by the other flame in the final flame envelope.

11. The method of claim 9 and further comprising the step of adjusting the fuel-air ratio of the fuel and air provided to the burner tubes to change the luminosity of the final flame envelope.

12. A burner comprising a pair of concentric burner tubes defining a central burner chamber and an annular burner chamber surrounding said central burner chamber, a distribution plate in abutment with the common end portions of said concentric burner tubes, an air plenum formed at the surface of said distribution plate opposite to said burner tubes, a fuel plenum formed adjacent said air plenum, air passages extending from said air plenum through said distribution plate and into said central burner chamber and said annular burner chamber, fuel conduits extending from said fuel plenum through said air plenum and into said central burner chamber and said annular burner chamber, said air passages and said fuel conduits comprising means for providing fuel and air in a first ratio to said central burner chamber and for providing fuel and air in a second ratio at a different fuel-air ratio to said annular burner chamber, and means for directing the flames emitted from said burner chambers into a common space to form a final flame envelope.

13. A burner for forming a low NOx luminous flame comprising a first burner chamber means and a second burner chamber means surrounding said first burner chamber means, means closing both burner chamber means at a common end, and said burner chamber means each defining a flame discharge opening at its other end, means for providing a first mixture of fuel and air in a relatively rich fuel-to-air ratio to the inner burner chamber means and for partially burning the relatively rich mixture in said first burner chamber means and projecting the flame out of the flame discharge opening of said first burner chamber means, means for providing a second mixture of fuel and air in a relatively lean fuel-to-air ratio to the outer burner chamber means and partially burning the relatively lean mixture in said second burner chamber means and projecting the flame out of the flame discharge opening of said second burner chamber means, and a flame diverter at the discharge openings of said first and second burner chamber means for directing the flame generated by the outer burner tube inwardly toward the flame generated by the inner burner tube for mixing the flames from the first and second burner chamber means to form a final flame envelope outside the first and second burner chamber means so that the air in the flame generated by the lean fuel-air mixture supports combustion of the fuel in the flame generated by the rich fuel-air mixture.

* * * * *